Aug. 29, 1950     J. G. WRIGHT ET AL     2,520,521
FASTENER FORMING AND INSERTING MACHINE
Filed May 25, 1945     5 Sheets-Sheet 1
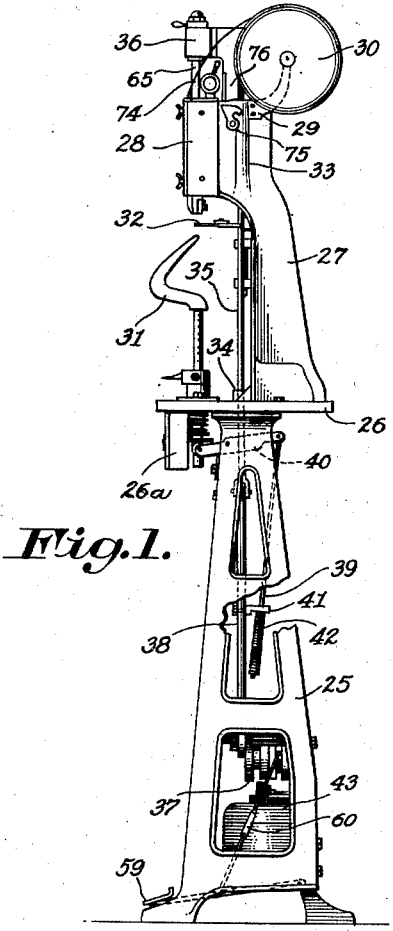
Fig.1.
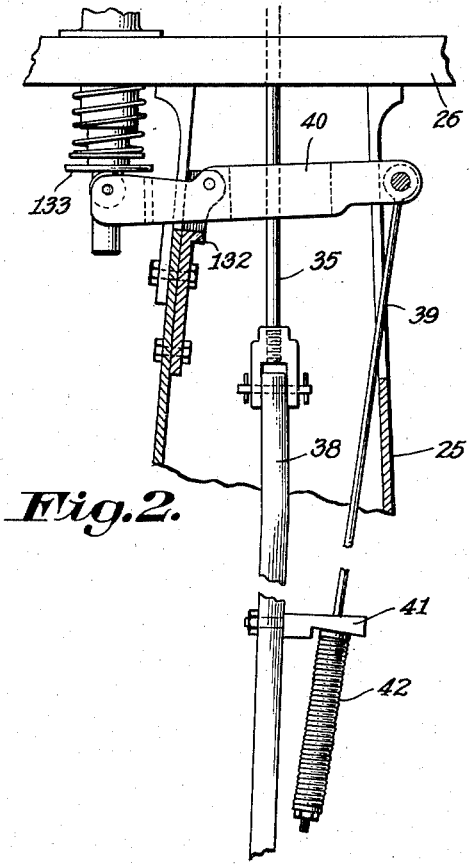
Fig.2.
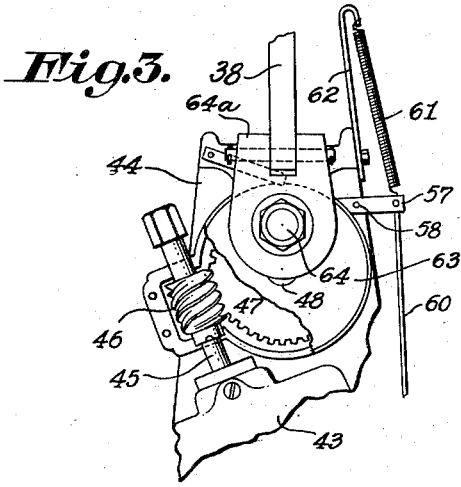
Fig.3.
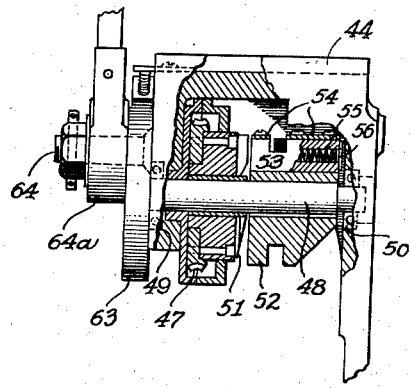
Inventor
John G. Wright
Charles D. Toney
Charles A. Watkins
Eugene Sudan
By Warley L. Parrott
Attorney Aug. 29, 1950   J. G. WRIGHT ET AL   2,520,521
FASTENER FORMING AND INSERTING MACHINE
Filed May 25, 1945   5 Sheets-Sheet 2
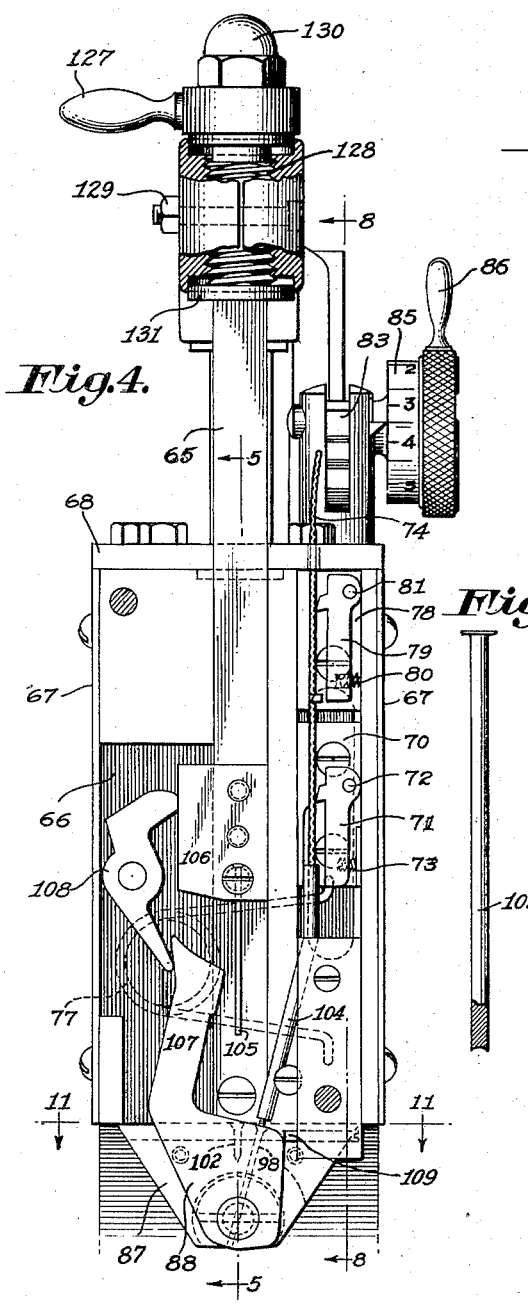
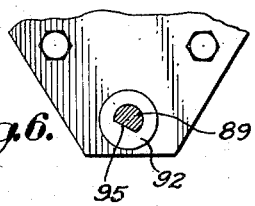
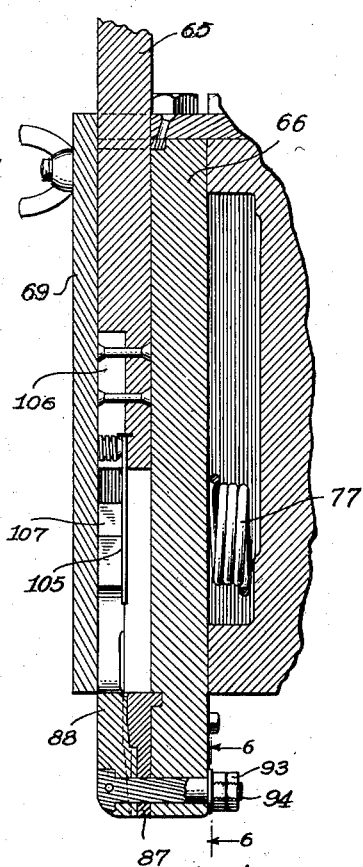

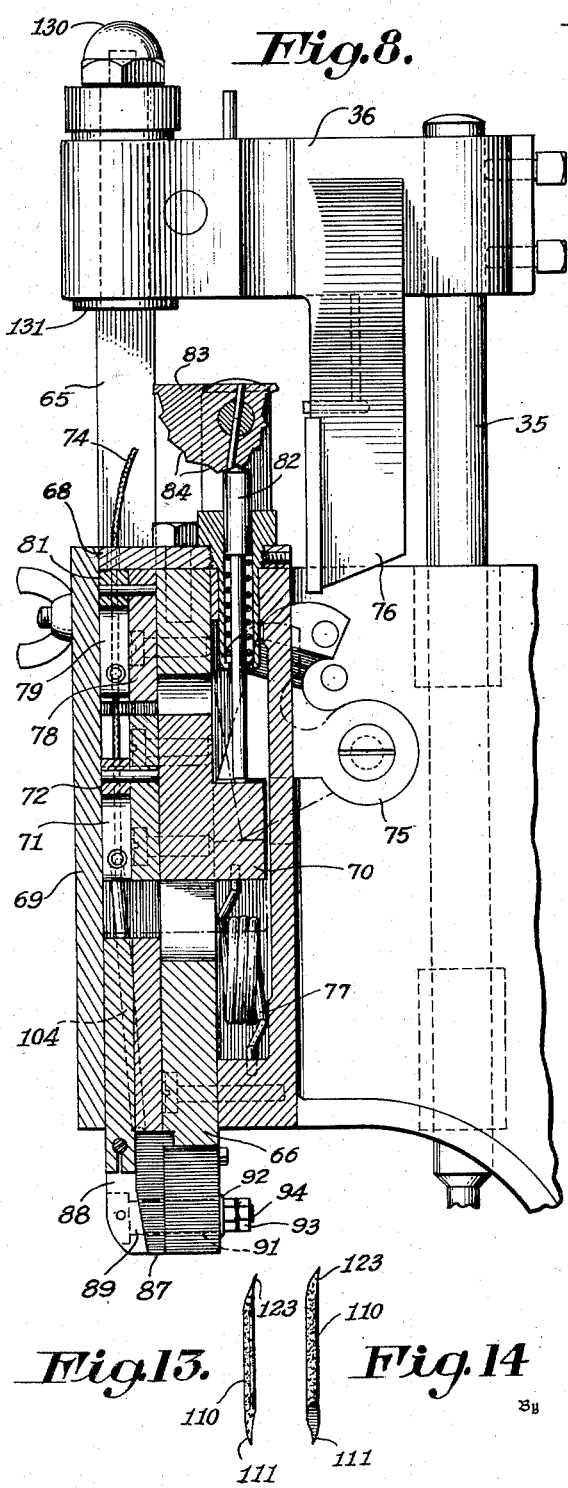

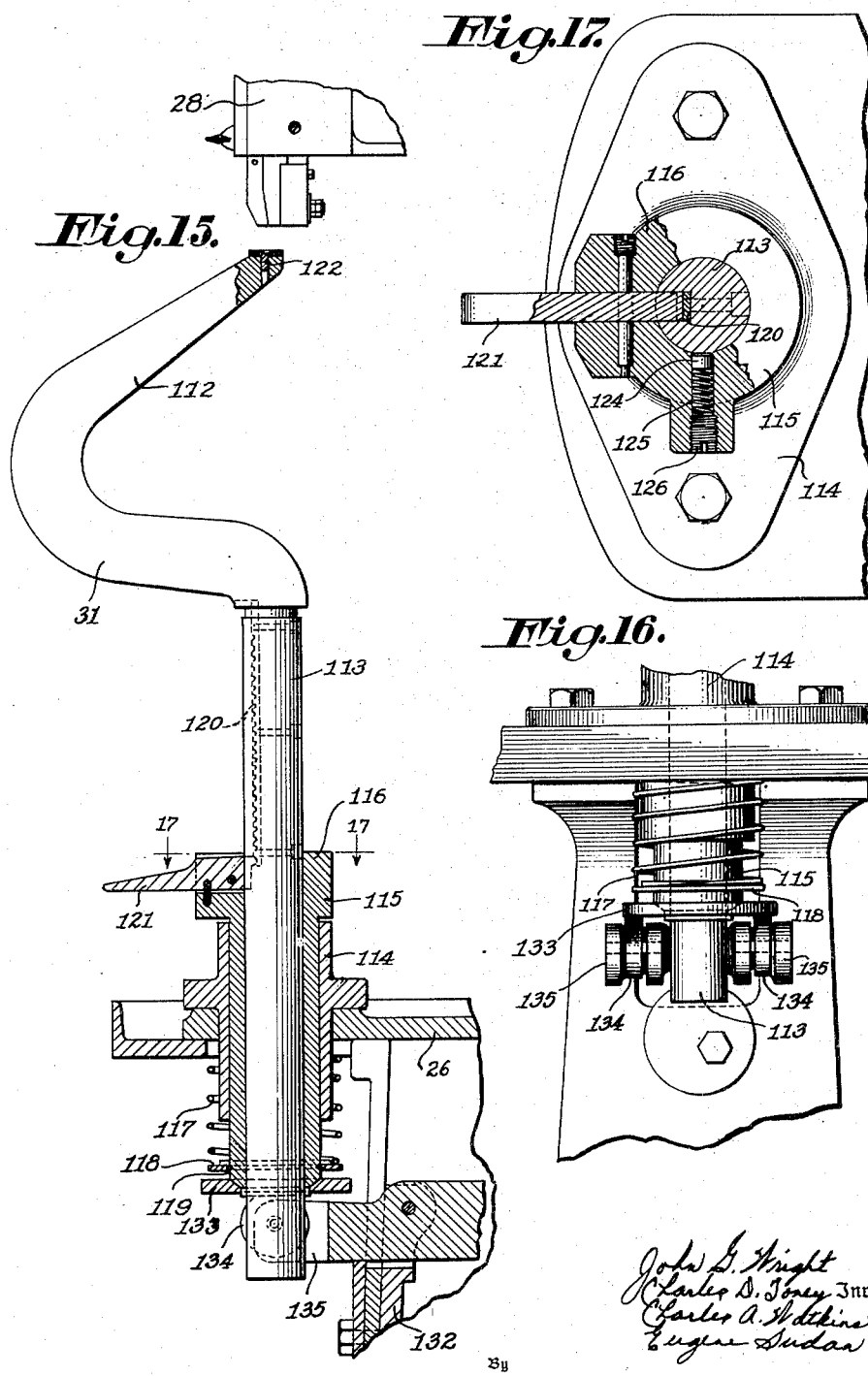

Patented Aug. 29, 1950

2,520,521

UNITED STATES PATENT OFFICE 2,520,521

FASTENER FORMING AND INSERTING MACHINE

John G. Wright, Charles D. Toney, Charles A. Watkins, and Eugene Sudan, Atlanta, Ga., assignors to The Auto-Soler Company, a corporation of Georgia Application May 25, 1945, Serial No. 595,776

2 Claims. (Cl. 10—43)

This invention relates to fastener forming and inserting mechanisms by which fasteners are formed from a continuous length of wire or the like and inserted in material to be fastened such as the soles of shoes.

While machinery for soling shoes of the type disclosed in U. S. Patents 2,049,240; 2,240,429; and 2,315,382, is a principal embodiment of our invention, it will be apparent that this invention is also well adapted for other applications, such as for wood working machinery and the like.

An important feature of our invention is an improved fastener forming knife assembly which forms an improved type of fastener. In fastener forming and inserting machinery of the kind to which our invention is adapted, it is very difficult to attain consistent straight driving of the fasteners. A relatively sharp point is needed on the fasteners for ready penetration of the material to be fastened. Such a point is most easily obtained by cutting the continuous length of wire, from which the fasteners are formed, diagonally in the manner disclosed in the above mentioned patents. But a point formed in this manner is necessarily offset from the longitudinal axis of the fastener formed and has a tendency upon driving to deflect in the direction of this offset and thus penetrate the material being fastened ineffectively. That is, a fastener with a diagonally formed point of this sort will often wander as it enters the material being fastened so that crooked driving results, and this effect is particularly troublesome when relatively hard materials are being worked with.

According to the present invention the diagonal point of the fasteners formed is displaced by our improved knife assembly to a position substantially coincident with the longitudinal axis of the fasteners, with a consequent marked improvement in the straight driving characteristics of the fastener formed.

This and other improved features of our invention are illustrated in the accompanying drawings, in which:

Fig. 1 is a side elevation of a fastener forming and inserting machine constructed according to our invention;

Fig. 2 is a corresponding fragmentary detail view showing the arrangement of the operating rod and lifter arm for motor drive;

Fig. 3 is a fragmentary detail in front elevation further illustrating the arrangement for motor drive;

Fig. 4 is a front view of the operating head with the cover plate removed;

Fig. 5 is a section on the line 5—5 of Fig. 4;

Fig. 6 is a rear view of the lower end of the operating head;

Fig. 7 is an enlarged view partly in section of the driver showing the form of tip employed;

Fig. 8 is a section on the line 8—8 of Fig. 4;

Fig. 9 is a plan view of the movable blade member;

Fig. 10 is a corresponding view of the stationary blade member;

Fig. 10b is a corresponding section of the stationary blade member oriented substantially on the line 10b—10b of Fig. 10a;

Fig. 11 is a section substantially on the line 11—11 of Fig. 4;

Fig. 12 is a corresponding section showing the movable blade member in fastener inserting position;

Fig. 13 is a view illustrating the type of fastener formed by the machine of our invention;

Fig. 14 is a corresponding side view;

Fig. 15 is a side view partly in section of the work support assembly;

Fig. 16 is a fragmentary front elevation of the work support assembly; and

Fig. 17 is a section on the line 17—17 of Fig. 15.

Figure 12A:
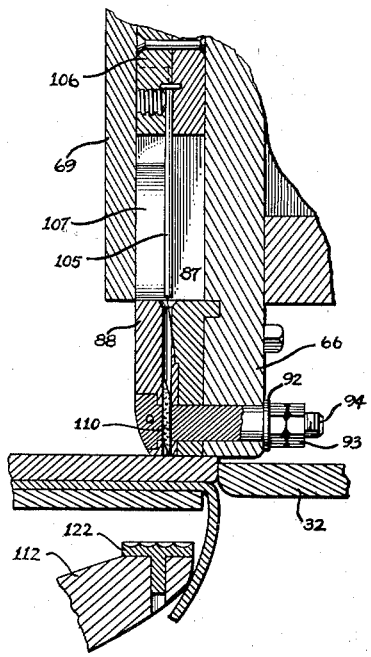
Fig. 12a is a partial vertical section of the operating head showing a fastener in position for insertion.

Our invention comprises generally a fastener forming and inserting mechanism having means for forming a plurality of fasteners from a continuous length of wire and coordinated means for inserting the fasteners formed to join layers of material and the like. The various elements of the machine are arranged and coordinated so that an entire cycle of operation is performed rapidly and efficiently by a single actuation by an operator. The means for actuation in the preferred form of our invention is by motor driven means.

The fastener forming and inserting machine constructed according to our invention shown in Fig. 1 comprises a lower frame section 25 having a shelf 26 arranged on its upper end and carrying an upper frame section 27 extending uprightly above the shelf. The upper frame section 27 extends forwardly at its upper end to form a support for an operating head 28 and has a bracket 29 attached rearwardly of its upper end to support a reel mounting 30 adapted to accommodate a reel of wire from which fasteners may be formed. A work support element 31 is arranged on the shelf 26 in vertical alignment with the operating head 28. An adjustable work guide 32, which may be of the type disclosed in the above mentioned U. S. Patent 2,315,382, is mounted on the upper frame section 27 for use in positioning work on the support element 31 in proper relation to the operating head 28.

The upper frame section 27 is formed with upper 33 and lower 34 bearing supports adapted to receive an operating rod 35 for vertical reciprocation. This operating rod 35 extends above the upper frame section 27 to a crosshead 36 which in turn extends forwardly to serve as a mounting for the plunger element of the operating head 28 to be described later.

The operating rod 35 also extends through the lower bearing support 34 in the upper frame section 27 to a connection with the driving means for the machine. In the preferred embodiment of our invention illustrated in Fig. 1, this driving means is a motor driven unit 37, but it will also be apparent that the machine might be easily adapted for manual operation as well. The connection with the motor drive unit 37 comprises a crank bar 38 connected to the operating rod 35 and extending downwardly inside the lower frame section 25 to a point of attachment with the motor drive unit 37. The crank bar 38 also supports a connecting rod 39 running to a lifter arm 40 which actuates the work support element 31 in a manner to be described more in detail below. A bracket 41 is mounted on the crank bar 38 to support the crank rod 39 and to act as an upper limit for a compression spring 42 which is carried on the lower end of connecting rod 39 and which serves the dual purpose of a point of adjustment for the pressure applied through the lifter arm 40 and a means for stopping the crank bar 38 in proper position after completion of a stroke.

The motor drive unit 37 (see Figs. 2 and 3) comprises an electric motor 43 mounted on a bracket 44 secured to the lower frame section 25, and controlled through a suitable electric circuit (not shown) from a switch box 26a accessibly arranged on the under side of shelf 26. The shaft 45 of the motor 43 extends upwardly and is inclined at an angle sufficiently off of vertical to position a worm 46 carried on the shaft 45 in driving engagement with a worm wheel 47 arranged on a crank shaft 48 disposed horizontally above the motor 43 and supported in bearings 49 and 50 provided in the bracket 44. The worm wheel 47 is mounted on the shaft 48 in association with a driving clutch member 51, both the worm wheel 47 and clutch member 51 being arranged to rotate freely on the crank shaft 48. A second driven clutch member 52 is fixed on the crank shaft 48 in opposed spaced relation to the driving clutch member 51 and is fitted with a clutch pin 53 which may be released to engage the driving clutch member 51. The clutch pin 53 is fitted in a longitudinal groove in the driven clutch member 52 and is held slidingly in place by plates 54 secured on clutch member 52. A clutch pin spring 55, internally arranged as shown in Fig. 2 and also held in place by a plate 56 secured on clutch member 52, urges the clutch pin 53 to engagement with the driving clutch member 51. The clutch pin 53 is retained in retracted position by a retaining lever 57 pivoted as at 58 (see Fig. 3) on bracket 44, which may be tripped to release the clutch pin 53 by depressing an operating pedal 59. The pedal 59 is pivotably mounted at the bottom of the lower frame section 25 and extends conveniently in front of the machine. A rod member 60 connects the lever 57 for tripping by the pedal 59, the lever 57 being normally held in retaining position by a tension spring 61 extended from a bracket 62 arranged on the motor bracket 44.

When the clutch pin 53 is released to engage the driving clutch member 51, the rotation of the motor 43 is transmitted through the worm 46, worm wheel 47, and driving and driven clutch member 51 and 52 to the crank shaft 48, and in turn to a crank plate 63 mounted on the front end of crank shaft 48 and fitted with an eccentrically disposed crank pin 64. A clevis assembly 64a fits on this crank pin 64 to receive the upper end of the previously mentioned crank bar 38 so that rotation of the crank shaft 48 causes reciprocation of the operating rod 35 for actuation of the operating head 28.

The operating hear 28 comprises a wire feed mechanism and a fastener forming knife assembly coordinated with a plunger member 65 adapted for driving the fasteners formed. The various elements of the operating head 28 are assembled on an operating head block 66 which is mounted on the previously mentioned forwardly portion of the upper frame section 27 and has appropriate grooves and recesses arranged to accommodate these elements. Side plates 67, a top plate 68, and a cover plate 69 are secured to the head block 66 to enclose the operating head 28.

The wire feed mechanism includes a feed block 70 slidably received by the operating head block 66 (see Figs. 4 and 8) and provided with a feeder blade 71 which is yieldingly pressed around a pivot point 72 by a spring 73 to engage the wire 74 supplied from the reel mounting 30. The feed block 70 extends rearwardly through an opening in the operating head block 66 for association with a cam member 75 which is pivoted on the upper frame section 27 and is depressed during each stroke of the operating rod 35 by a projection 76 extending downwardly from the cross head 36. A spring 77 is arranged on the under side of the rearwardly extending portion of the feed block 70 to hold it yieldingly in raised position. A fixed block 78 is arranged vertically above the feed block 70 and is provided with a retaining blade 79 similar to the feeder blade 71 and is similarly arranged with a spring 80 pressing it into engagement with the wire 74 around a pivot 81. The retaining blade 79 allows the wire 74 to be fed downwardly but prevents withdrawal unless it is moved out of engagement with the wire.

During operation of the machine, the wire feed block 70 is depressed by the above described arrangement of cam 75 and projection 76 upon each stroke of the operating rod 35. As the feed block 70 is depressed, the feeder blade 71 grips the wire 74 and feeds it downwardly to an extent corresponding to the downward travel of the feeder block. The extent of this travel, which, as will appear more clearly below, establishes the length of fastener formed, is variable by virtue of an adjusting mechanism arranged on the operating head 28. This adjusting mechanism consists of a positioning stem 82 resiliently mounted in the top plate 68 and extending downwardly to a point of contact with the rear extension of the wire feed block 70. The stem 82 acts as an upper limit determining the raised position of the feed block 70 and thus regulates the extent of downward travel of, and the consequent amount of wire 74 fed by, the feed block 70. The stem 82 is adjustable to vary the raised position of the feed block 70 through contact at its upper end with an eccentric cam 83 which is also mounted on the top plate 58. The stem 82, being resiliently mounted as mentioned above, is held in contact with this cam 83, and its upper end is formed to shift smoothly from one to another of a series of notches 84 formed in the surface of cam 83. The faces of the notches 84 are formed with a low angle of inclination. These notches 84 correspond to positions for the stem 82 which give particular fastener lengths as indicated on a dial 85 associated with a lever 86 provided for manipulating the cam 83. The upper end of the stem 82 has a conical form, the sloping sides of which include an angle slightly less (suitably 2° less) than the angle included between the faces of the notches 84. This arrangement assures proper seating of the upper end of the stem 82, which may have a slightly rounded tip, in the notches 84.

The fastener forming knife assembly comprises a stationary blade member 87 secured at the lower end of the operating head block 66, and a matched movable blade member 88 having a stud projection 89 fitting a corresponding aperture 90 in the stationary blade member 87 as a pivot for the movable blade member 88. This stud projection 89 extends through the aperture 90 and a similar opening 91 in the head block 66 to receive a washer 92 and adjusting jam nuts 93, or other similar fastening means, on a threaded portion 94. The threaded portion 94 is formed with a flat surface 95 (see Fig. 6) and the washer 92 is fitted to the contour of this flat surface so that it turns as the stud projection 89 turns with pivoting of the movable blade 88 and thus prevents this pivoting from varying the adjustment of jam nuts 93. The movable blade member 88 has a working surface portion 96 formed with a conical configuration, and the stationary blade member 87 has a corresponding recessed portion 97. A passageway 98 is formed in the movable blade member 88 which is adapted to receive and position the wire 74 for fastener forming and fastener inserting operations. The passageway 98 is arranged perpendicularly and in diametric relation with respect to the stud projection 89 and is disposed to intersect the working surface portion 96 of the movable blade member 88 partially so that it extends at its receiving end as a slot 99, one edge 100 of which is adapted as a shearing edge. Supplementary slots 101 and 102 are formed in the working surface portion 97 of the stationary blade member 87 for registry with the slot 99 in the movable blade member 88 in fastener forming and fastener inserting positions, respectively, and the supplementary slot 101 in fastener forming position is also arranged with a shearing edge 103 which is described more in detail below.

The wire 74 is fed to the knife assembly by the above described wire feed mechanism through a guide tube 104 which leads the wire 74 into the passage in the knife assembly formed in fastener forming position by the passageway 98 and slot 99 in the movable blade member 88 and the supplementary slot 101 in the stationary blade member 87. When the movable blade member 88 is pivoted about its stud projection 89, a length of the wire 74 is severed by the shearing edges 100 and 103 provided on the blade members, and this length of wire is carried in the passageway 98 in the movable blade member 88 to fastener inserting position, in which position the passageway 98 and extending slot 99 are aligned with the supplementary slot 102 to receive a driver 105 carried by the plunger member 65.

The plunger member 65 is mounted on the crosshead 36 to extend downwardly through the operating head block 66, and is arranged at its lower end to carry the driver 105 which is adapted to pass through the knife assembly in fastener inserting position and drive the fastener formed by the knife assembly. The plunger member 65 and knife assembly are coordinated by a cam arrangement which consists of a cam block 106 secured at the lower end of the plunger member 65, an upwardly extending cam arm 107 on the movable blade member 88, and a trigger-like cam element 108, pivoted on the head block 66, as at 109, in association with the cam block 106 and cam arm 107.

On a downward stroke of the operating rod 35, the crosshead 36 is depressed so that the plunger member 65 and the projection 76 associated with the wire feed cam 75 travel downwardly simultaneously. At the beginning of the stroke, the wire feed cam 75 is actuated to move the feeder block downwardly so as to feed a length of wire to the knife assembly. With continued downward motion the wire feed cam 75 reaches the position shown in dotted lines in Fig. 8 so that the crosshead projection 76 runs off of the cam surface and the wire feed is stopped. As this occurs, the cam block 106 on the plunger member 65 contacts the upstanding cam arm 107 on the movable blade member 88 and pivots this blade member so that a fastener is formed and moved into fastener inserting position. Continued downward movement then causes the driver 105 to penetrate the previously described passage formed in the knife assembly, and drive the fastener formed.

As this operation is completed and the operating rod 35 starts its upward stroke, the trigger-like cam element 108 is contacted by cam block 106 as upward travel of the plunger member 65 continues so that cam element 108 is caused to pivot and thus return the movable blade member 88 through action on cam arm 107 to fastener forming position. A stop 109 is provided for the movable blade 88 in fastener forming position. During upward travel of plunger member 65, the wire feed block 70 and associated cam element 75 are raised to initial position by spring 77.

The type of fastener 110 formed and driven in the operations just described is illustrated in Figs. 13 and 14. From the foregoing description it will be appreciated that the fasteners 110 are formed by cutting the continuous length of wire 74 at intervals corresponding to the length of fastener 110 desired, and that the wire 74 is cut diagonally by virtue of the conical configuration of the working surface portions 96 and 97 of the blade members 88 and 87, respectively.

The diagonal manner in which the wire 74 is cut is designed to form the fasteners 110 with pointed ends so that they may be driven readily, and it has heretofore been thought that ease of driving bore a direct relation to the sharpness of the diagonally formed point. As heretofore mentioned, however, considerable difficulty has been encountered in obtaining consistent straight driving with diagonally pointed fasteners. We have found that this difficulty is obviated by displacing or transferring the diagonal point 111 on the leading end of the fastener 110 to a position substantially coincident with the longitudinal axis of the fastener, even though such displacement dulls the point 111 somewhat.

Displacement of the point 111 in this manner is accomplished by our improved knife assembly during the fastener forming operation. In particular, the displacement is effected by forming the shearing edge 103 on the supplementary slot 101 of the stationary blade member 87 arcuately (see Fig. 10) on a radius perpendicular to the longitudinal axis of the slot 101. This form of shearing edge 103 appears to exert a pull on the leading diagonal point formed as the wire 74 is cut sufficient to cause the desired displacement. For a knife assembly adapted for use with 19 gauge wire, we have found that a forming radius for the shearing edge 103 of 0.710 inch gives very satisfactory results, although this radius may have to be adjusted for different sizes of wire where the material to be fastened is of a special character.

Figure 10A:
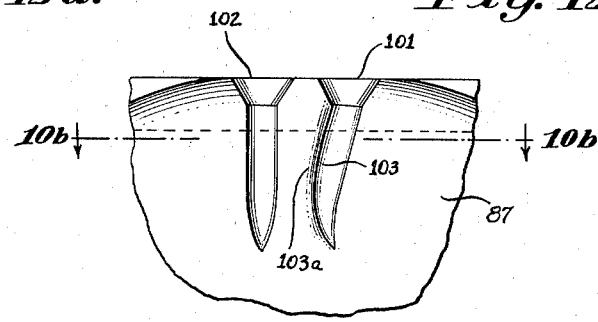
Fig. 10a is a fragmentary detail showing a modified form of the stationary blade member.
Figure 10B:
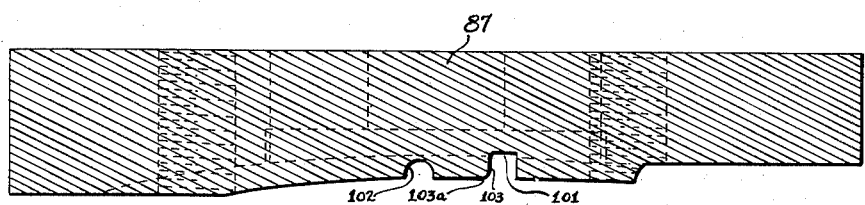

The fastener point forming action of the shearing edge 103 may also be adjusted for varying conditions, without changing the radius of its arcuate form, by laying it over with a negative cutting angle as indicated at 103a in Figs. 10a and 10b. That is, by forming the shearing edge 103 so that it is not a true shearing or cutting edge but is adapted to sever the wire 74 with a squeezing action. The characteristic form of the fastener point 111 illustrated in Figs. 13 and 14 is emphasized by an arrangement of the shearing edge 103 in this manner.

The material to be fastened is supported in alignment with the operating head 28 by the work support element 31. In machinery for soling shoes this work support element 31 conveniently comprises a vertically movable horn 112 having a shank 113 adapted to be slidingly received by a mounting arranged on the shelf 26. The mounting for the work support element 31 consists of a vertically disposed fixed sleeve 114 fastened to and extending through an opening in the shelf 26 and a vertically movable sleeve 115 rotatably and slidably mounted in and extending through the fixed sleeve 114.

An important feature of the work support element 31 of the present invention is the arrangement of the horn shank 113 to provide a full bearing surface in the movable sleeve 115 when the horn 112 is in fully raised position as shown in Fig. 14. For this purpose, the elements for subjecting horn 112 to the necessary upward pressure during fastener forming operations are adapted, as described more in detail below, to accommodate a horn shank 113 of sufficient length so that a portion of the shank 113 is always disposed throughout the entire extent of movable sleeve 115, thus obtaining the above mentioned full bearing support and providing maximum support for horn 112 in a raised position. This arrangement supports the horn 112 securely so that it does not shift during fastener inserting operations and in this manner has an important bearing upon the satisfactory operation of the machine.

The movable sleeve 115 is formed with an enlarged collar portion 116 at its upper end which limits its downward movement in the fixed sleeve 114. Upward movement of the movable sleeve 115 is yieldably resisted by a spring 117 mounted around the fixed sleeve 114 between shoulders formed by the bottom of shelf 26 and a washer 118 fitted on the lower extending portion of the movable sleeve 115 and held in place by spring wire 119 arranged in a circumferential groove in movable sleeve 115 and a corresponding recess formed in the underside of washer 118. The horn 112 of the work support element 31 is vertically adjustable by virtue of the sliding engagement of shank 113 in movable sleeve 115. The horn 112 may be secured in an adjusted vertical or raised position by means of any insert 120 mounted on horn shank 113 having ratchet teeth formed therein which cooperate with a pawl lever 121 pivoted on the movable sleeve 115 according to the arrangement disclosed in U. S. Patent 2,240,429, to hold the horn 112 releasably in a desired raised position. The insert 120 and pawl lever 121 are arranged so that the horn 112 may be released for downward adjustment by tripping the pawl lever 121 without causing any appreciable upward movement of the horn.

A further feature of the work support element 31 of this invention is a braking arrangement adapted to cushion the downward movement of horn 112 when the pawl lever 121 is tripped to move the horn 112 to lowered position. This arrangement comprises a plug 124 formed of brass or other suitable material adjustably mounted in the movable sleeve 115 by a spring 125 and set screw 126. By adjustment of the set screw 126 pressure may be exerted through the spring 125 on plug 124 to regulate the rate of the descent of horn 112 so that it operates smoothly.

Figure 12B:
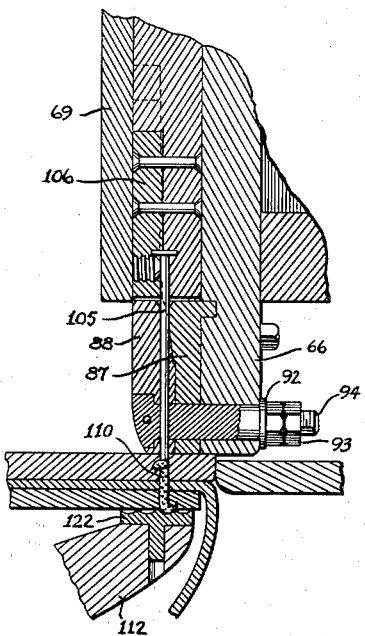
Fig. 12b is a corresponding partial vertical section of the operating head showing the fastener inserted.

In fully raised position the horn 112 is spaced in close vertical relation with the operating head 28 to position work for fastener inserting operations. The tip of the horn 112 is fitted with a clinching tip 122 formed with concentric grooves as indicated in Fig. 15 (compare Figs. 12a and 12b). The previously mentioned driver 105 is also formed with a concave tip as illustrated in Fig. 7. The configuration of the tip of driver 105 centers the driving end 123 of fastener 110 during the fastener inserting operation and also tends to form a head on the driven fastener. The driving end 123 has a reversely curved form with respect to the leading point 111 (see Figs. 13 and 14), which is formed as a complementary result of the manner in which leading point 111 is formed. The concentric grooves on the clinching tip 122 of horn 112 clinch the leading point 111 of fastener 110 as it penetrates the material being joined, and thus dispose the fastener point 111 in secure fastening position.

The driving depth of driver 105 may be adjusted to obtain countersinking effects if desired. This adjustment is accomplished by setting an adjusting lever 127 associated with the mounting of plunger member 65 on crosshead 36. The crosshead 36 is formed at its forward end with a threaded opening adapted to receive a threaded portion 128 arranged integrally with the adjusting lever 127. The crosshead 36 is also split at its forward end as illustrated in Fig. 4 and provided with a screw adjustment 129 allowing the threaded portion 128 to be frictionally gripped in the crosshead 26 to prevent shifting of the adjusting lever 127 after it has been set, but leaving lever 127 free at all times for adjusting the driving depth of driver 105. Plunger member 65 is formed with a cylindrical upper portion adapted to extend through the threaded portion 128 and body of lever 127, and terminating in an extending threaded portion of reduced diameter fitted with a nut 130. When adjusted to raise driver 105, the body of lever 127 is raised by virtue of its threaded engagement with crosshead 26 and thus bears upwardly against nut 130 to raise the entire assembly of plunger member 65. Adjustment of lever 127 in the other direction to lower driver 105 causes the lower end of threaded portion 128 to bear downward on the shoulder formed at the lower end of the cylindrical portion of plunger member 65, which may be enlarged through the use of a washer as at 131 in Fig. 4. This adjustable mounting of plunger member 65 allows the driving depth of driver 105 to be readily adjusted in relation to work support element 31 for the degree of countersinking desired.

During fastener inserting operations the horn 112 is subjected to upward pressure simultaneously with downward travel of the plunger member 65 so that the work being fastened is pressed tightly between the clinching tip 122 on the horn 112 and the knife assembly forming the lower extending portion of the operating head 28 in which the driver 105 operates to insert the fasteners 110. This upward pressure on the horn 112 is exerted through the previously mentioned lifter arm 40 which is fulcrumed on a bracket 132 mounted on the lower frame section 25 and connected as previously described with the operating rod 35. During a downward stroke of the operating rod 35 the lifter arm 40 accordingly pivots about its fulcrum point on bracket 132 to exert upward pressure on the horn 112. The arrangement of the lifter arm 40 for thus actuating the horn 112 consists of a floating washer 133 arranged as illustrated in Fig. 15 to fit the lower tapered end of movable sleeve 115 and form a bearing surface for rollers 134 carried by bifurcated arms 135 on the lifter arm 40. This arrangement provides clearance for the horn shank 113 when the horn 112 is moved to a fully lowered position and also allows rotation of the movable sleeve 115 for horizontal adjustment of the disposition of horn 112.

We claim:

1. A fastener forming knife assembly comprising a stationary blade member and a matched movable blade member assembled with said stationary blade member for pivoting movement with respect thereto, said movable blade member having a working surface portion formed with a conical configuration and said stationary blade member having a complementary recessed working surface portion, said working surface portions being arranged in concentric relation to the pivot axis of said blade members, and means adapting said blade members to receive and position wire for fastener forming and fastener inserting operations, said means including a radial slot in said movable blade member and a slot in said stationary blade member in fastener forming position cooperating with said radial slot in the movable blade member to cut said wire diagonally at said conical working surface portions to form a fastener point, and said slot being disposed in generally radial relation with respect to the pivot axis of said blade members but having an arcuate longitudinal axis whereby it presents a curved shearing edge adapted to effect displacement of the point on fasteners formed by said knife assembly to a position substantially coincident with the longitudinal axis of the fasteners.

2. A fastener forming knife assembly of the type adapted for use in fastener forming and inserting mechanisms, said knife assembly comprising a stationary blade member and a matched movable blade member assembled with said stationary blade member for pivoting movement with respect thereto between fastener forming and fastener inserting positions, said movable blade member having a working surface portion formed with a conical configuration and said stationary blade member having a complementary recessed working surface portion, said working surface portions being arranged in concentric relation to the pivot axis of said blade members, and means adapting said blade members to receive and position wire for fastener forming and fastener inserting operations, said means including a radial slot in said movable blade member and a slot in said stationary blade member in fastener forming position cooperating with said radial slot in the movable blade member to cut said wire diagonally at said conical working surface portions to form a fastener point, and said slot being disposed in generally radial relation with respect to the pivot axis of said blade members but having an arcuate longitudinal axis whereby it presents a curved shearing edge adapted to effect displacement of the point on fasteners formed by said knife assembly to a position substantially coincident with the longitudinal axis of the fasteners.

JOHN G. WRIGHT.
CHARLES D. TONEY.
CHARLES A. WATKINS.
EUGENE SUDAN.

REFERENCES CITED

The following references are of record in the file of this patent:

UNITED STATES PATENTS

| Number | Name | Date |
| --- | --- | --- |
| 82,886 | Snell | Oct. 6, 1868 |
| 135,915 | Hollis | Feb. 18, 1873 |
| 156,909 | Buxton | Nov. 17, 1874 |
| 181,126 | Angst | Aug. 15, 1876 |
| 238,571 | Chaplin | Mar. 8, 1881 |
| 313,681 | Overell | Mar. 10, 1885 |
| 376,114 | Smith | Jan. 10, 1888 |
| 475,407 | Marsh | May 24, 1892 |
| 538,032 | Bestgen | Apr. 24, 1895 |
| 611,990 | Casgrain | Oct. 4, 1898 |
| 669,023 | Casgrain | Feb. 26, 1901 |
| 947,626 | Chapin | Jan. 25, 1910 |
| 1,119,510 | Heim | Dec. 1, 1914 |
| 1,191,682 | Finch | July 18, 1916 |
| 1,357,752 | Weber | Nov. 2, 1920 |
| 1,388,846 | Brock | Aug. 30, 1921 |
| 1,575,582 | Joy | Mar. 2, 1926 |
| 1,839,259 | Pope | Jan. 5, 1932 |
| 1,979,395 | Minard | Nov. 6, 1934 |
| 2,049,240 | Ajouelo | July 28, 1936 |
| 2,160,843 | Duran | June 6, 1939 |
| 2,240,429 | Watkins | Apr. 29, 1941 |
| 2,315,382 | Ajouelo | Mar. 20, 1943 |
| 2,355,807 | La Place | Aug. 15, 1944 |
| 2,385,474 | Schulz | Sept. 25, 1945 |